United States Patent
Coleman et al.

(10) Patent No.: US 6,636,285 B2
(45) Date of Patent: Oct. 21, 2003

(54) REFLECTIVE LIQUID CRYSTAL DISPLAY WITH IMPROVED CONTRAST

(75) Inventors: Zane Arthur Coleman, Atlanta, GA (US); George Thomas Valliath, Buffalo Grove, IL (US); Jon Lindsay Schindler, Glenview, IL (US)

(73) Assignee: Motorola, Inc., Schaumburg, IL (US)

( * ) Notice: Subject to any disclaimer, the term of this patent is extended or adjusted under 35 U.S.C. 154(b) by 7 days.

(21) Appl. No.: 10/002,511

(22) Filed: Nov. 1, 2001

(65) Prior Publication Data

US 2003/0081154 A1 May 1, 2003

(51) Int. Cl.⁷ .......................................... G02F 1/1335
(52) U.S. Cl. ..................................................... 349/112
(58) Field of Search ........................... 349/112, 64, 113

(56) References Cited

U.S. PATENT DOCUMENTS

| | | |
|---|---|---|
| 3,837,729 A | 9/1974 | Harsch |
| 4,298,249 A | 11/1981 | Gloor et al. |
| 5,046,827 A | 9/1991 | Frost et al. |
| 5,329,386 A | 7/1994 | Birecki et al. |
| 5,629,784 A | 5/1997 | Abileah et al. |
| 5,659,408 A | 8/1997 | Wenyon |
| 5,663,816 A | 9/1997 | Chen et al. |
| 5,721,630 A * | 2/1998 | Horner et al. ................. 359/15 |
| 5,731,858 A * | 3/1998 | Hisatake et al. ............ 349/112 |
| 5,796,455 A * | 8/1998 | Mizobata et al. ........... 349/112 |
| 5,847,860 A | 12/1998 | Hougham et al. |
| 6,075,579 A * | 6/2000 | Ueda et al. .................... 349/64 |
| 6,166,787 A * | 12/2000 | Akins et al. ................... 349/57 |
| 6,291,146 B1 * | 9/2001 | Chang et al. ................ 430/394 |

FOREIGN PATENT DOCUMENTS

| | | |
|---|---|---|
| GB | 2306229 A | 4/1997 |
| WO | WO 96/37805 | 11/1996 |
| WO | WO 98/32047 | 7/1998 |

OTHER PUBLICATIONS

T. John Trout, William J. Gambogi, Kirk W. Steijn and Steven R. Mackara; "15.3: Volume Holographic Components for Display Applications"; Society for Information Display 00 Digest; pp. 1–4.

Herwig Kogelnik; "Coupled Wave Theory for Thick Hologram Gratings"; The Bell System Technical Journal, vol. 48, No. 9 (Nov. 1969), pp. 2909–2947.

William J. Gambogi, Andrew M. Weber and T. John Trout; "Advances and Applications of DuPont Holographic Photopolymers"; Proc. SPIE. vol. 2043, pp. 2–13 (1993).

H. Hiraki, S. Ueki, S. Mitui, Y. Higashigaki, M. Matsuura; "P–54: A Reflective TFT–LCD Using Twist PDLC Mode with a Single Polarizer"; Digest of Technical Papers from Society for Information Display Conference; San Jose, Ca; May 1999; pp. 686–689.

(List continued on next page.)

Primary Examiner—Kenneth Parker
(74) Attorney, Agent, or Firm—Daniel K. Nichols

(57) ABSTRACT

A display (200) includes a slanted fringe volume hologram (206) or other optical element that steers light that passes into and out of the display (200) so as to provide angular separation between unmodulated scattered light and modulated reflected light. As a result of the angular separation the effective contrast of the display (200) is improved. By placing the slanted fringe volume hologram (206) below a front polarizer of the display a further reduction in the amount of unmodulated scatter light is achieved. The slanted fringe volume hologram is preferably a hologram of a diffusive object (328), and consequently exhibits a degree of light diffusion that results in a viewing zone of an appreciable angular extent.

18 Claims, 3 Drawing Sheets

OTHER PUBLICATIONS

G.T. Valliath, Z.A. Coleman, J.L. Schindler, R. Polak, R.B. Akins, K.W. Jelley; "*Design of Hologram for Brightness Enhancement in Color LCDs*"; Digest of technical Papers from Society for Information Display Conference; San Jose, CA; May 1998, p. 1139–1143.

Gregory P. Crawford; "*Liquid Crystal Displays: The Flatter the Better*"; IEEE Potentials; 1998; pp. 38–42.

DuPont Holographics; "*Holographic Front–Diffuser Application Note*"; Rev. Aug. 31, 2000; pp. 1–3.

Sanyo Product Description; "*Reflective LCD Technology Advances from Sanyo*".

Web Based LCD Comparison Chard located at: http://www.trl.ibm.com/projects/reflcd/refexpe.htm.

* cited by examiner

REFLECTIVE LIQUID CRYSTAL DISPLAY WITH IMPROVED CONTRAST

FIELD OF THE INVENTION

This invention pertains to liquid crystal displays. More particularly this invention pertains to reflective liquid crystal displays.

BACKGROUND OF THE INVENTION

Liquid crystal displays (LCD) are used in a variety of electronic devices including pagers, and portable digital assistants. Liquid crystal displays offer the advantages of compactness and low power consumption. Liquid crystal displays include an array of separately controllable display areas termed pixels. Each pixel includes electrodes for establishing a localized electric field that locally effects the state of a liquid crystal material. Propagation of light through the each pixel is in turn affected by the state of the liquid crystal material. Spatial modulation of light is achieved by applying different signals to the electrodes associated with different pixels of a display.

One variety of liquid crystal display is the reflective type. Reflective liquid crystal displays spatially modulate light by selectively (e.g., according to an image pattern) reflecting incident ambient light. The brightness of reflective liquid crystal displays is determined by the brightness of the ambient light, and the reflectivity of the display. In addition to brightness another important measure of performance of liquid crystal displays that is related to brightness is contrast. Contrast is the difference between the brightness of a display area (pixel) that is set to a non-reflecting (dark) state, and the brightness of a display area that is set to a reflecting (bright) state. Contrast of a display is diminished by reflections off of surfaces, and interfaces within the display that are located in front of the liquid crystal material. Such reflections are not spatially modulated and therefore increase the brightness of the entire display area including areas that are meant to be turned off. The latter problem is somewhat aggravated by the fact users tend to orient reflective liquid display at an angle close to the angle at which specular reflection of light from an ambient light source (e.g., fluorescent lamp, the sun) reaches their eyes. Unfortunately, orienting a liquid crystal display at an angle which leads to specular reflection of source light into a user's eyes leads increases the intensity of both spatially modulated, and unmodulated light reaching the user's eyes. In order to achieve acceptable contrast a user must precisely adjust the orientation of the display to an angle at which the spatially modulated light predominates over unmodulated light. The range of solid angle of orientation in which the display can be viewed (termed the viewing zone) may be quite limited, such that the user must be careful in maintaining the orientation of the display.

Published PCT application WO 98/32047 that is assigned to the assignee of the present invention teaches a liquid crystal display that includes a transmissive holographic element that deflects light so as to provide angular separation between light that has passed through a liquid crystal material layer (modulated light) and light that is reflected by the holographic without passing through the liquid crystal material layer (unmodulated light). The angular separation between the modulated and unmodulated light effectively increases the contrast of the display by allowing a user to view the modulated light without viewing the unmodulated light. A certain amount of reflection of spatially unmodulated light occurs at layer interfaces between the transmissive holographic element and the liquid crystal material. Such unmodulated reflection tends to decrease the contrast of the display What is needed is a liquid crystal display that increases the intensity of spatially modulated reflected light, relative to the amount of unmodulated reflected light.

What is needed is a display that provides increased contrast.

What is needed is a needed is a system that provides a viewing zone of substantial angular extent.

BRIEF DESCRIPTION OF THE DRAWINGS

The features of the invention believed to be novel are set forth in the claims. The invention itself, however, may be best understood by reference to the following detailed description of certain exemplary embodiments of the invention, taken in conjunction with the accompanying drawings in which:

DETAILED DESCRIPTION OF THE PREFERRED EMBODIMENT

Figure 1:
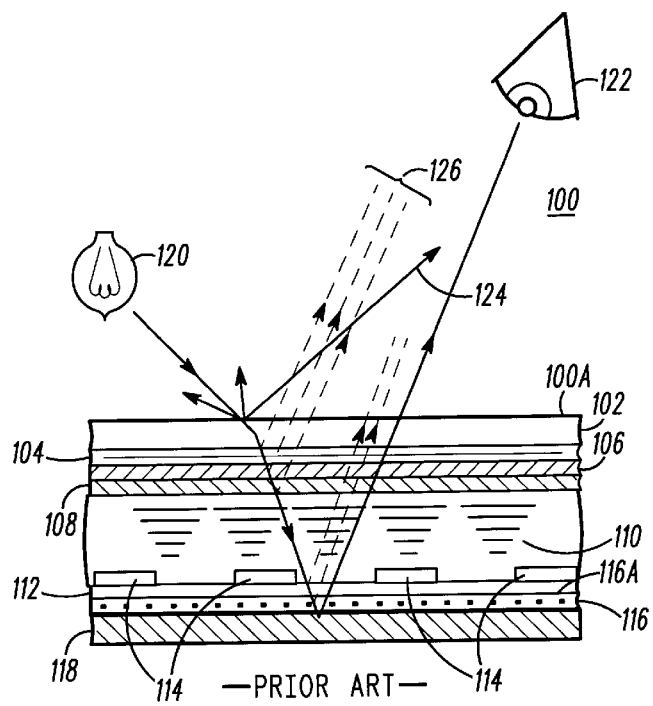
FIG. 1 is a schematic sectional elevation view of a prior art liquid crystal display that includes a transmission holographic optical element.

While this invention is susceptible of embodiment in many different forms, there are shown in the drawings and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. In the description below, like reference numbers are used to describe the same, similar, or corresponding parts in the several views of the drawings.

FIG. 1 is a schematic sectional elevation view of a prior art liquid crystal display 100 that includes a transmission holographic optical element 102 as taught in published PCT application WO 98/32047. The transmission holographic element 102 is located at a front viewing surface 100A of the display 100 overlying a first polarizer 104. A front liquid crystal containment wall 106 is located beneath the first polarizer 104. A transparent counter electrode 108 is deposited on the bottom of the front liquid crystal containment wall 106. A back liquid crystal containment wall 112 is located below the front liquid crystal containment wall 106. A twisted nematic liquid crystal material 110 is located between the front liquid crystal containment wall 106 and back liquid crystal containment wall 112. The front 106 and back 112 liquid crystal containment walls are transparent. A plurality of drive electrodes 114 are supported on the back liquid crystal containment wall 112. The drive electrodes 114 are used to in conjunction with the transparent counter electrode 108 to establish localized electric fields in the liquid crystal material 110 that locally affect the alignment of the liquid crystal 110 in order to spatially modulate the reflection of incident light. A second polarizer 116 is located below the back liquid crystal containment wall 112. A reflector 118 is located below the second polarizer 116. Alignment layer coatings (not shown) are applied to the transparent counter electrode 108, and back liquid crystal containment wall 112 in order to urge the liquid crystal material 110 into a twisted nematic state.

In operation light that emanates from a source 120 is incident on the display 100, is polarized by the first polarizer 104 and passes into the liquid crystal material 110. In the reflective state, owing to the twisted nematic state, the polarization of the light is rotated as it passes through the liquid crystal material 110. The light reaches the second polarizer 116 passes through it to the reflector 118, is reflected by the reflector 118 and pass back through the display 100 to a user's eye 122. In passing back through the liquid crystal material, the polarization of the light is again rotated so that it is able to pass through the first polarizer 104. In order to set a pixel of the display 100 to a dark state, a voltage is applied to an electrode 114 for the pixel in order to establish and electric field in the liquid crystal proximate the particular electrode 114. The electric field changes the state of the liquid crystal material 110 proximate the particular electrode from the twisted nematic state so that that the liquid crystal material in the vicinity of the particular electrode no longer serves to rotate the polarization of light passing through it. Since the polarization of the light is not rotated it is no longer able to pass through the second polarizer 116 to the reflector 118.

Light that is modulated by the display 100 passes through the transmission holographic element 100 twice. The transmission holographic element deflects light, so that light that emerges from the display 100 after being spatially modulated propagates in a direction that is different from a main direction 124 that characterizes light scattered off the transmission holographic element 102. Because of the difference in direction, the amount of unmodulated light reaching a users eye will be reduced, and the contrast of the display will be effectively increased. Note however that a portion of light 126 that is reflected by layer interfaces that are located between the transmission holographic element 102, and front surface 116A of the rear polarizer 116, propagates in the same direction as modulated light. The light reflected by the interfaces 126 is unmodulated and therefore tends to reduce the contrast of the display 100.

Liquid crystal displays are used in handheld devices such as text messaging pagers, cell phones, and personal digital assistants. When viewing the liquid crystal display of handheld devices, users tend to hold the handheld device so that a their own line of sight to the display makes an angle of up to about 15 degrees from perpendicular to the display surface. (As is conventional in the field of optics, angles of incidence at surfaces as discussed in this application, are measured from perpendiculars to the respective surfaces.) Furthermore handheld devices are commonly held such that a line between the display and the dominant ambient light source in the vicinity (e.g., a particular fluorescent light fixture, the sun) is between about 19 and 49 degrees from the perpendicular to the display. The average of the latter two angles, 34 degrees, is taken as representative of the typical angle at which the ambient light is incident on displays of handheld devices.

What is needed is a display that can accept illumination incident at an angle of between about 19 and 49 degrees, and output a substantial fraction of modulated light at an angle that is within 15 degrees of the perpendicular to the display surface, and reduce the amount of unmodulated light reflected at an angle within 15 degrees of the perpendicular to the display surface.

Figure 2:
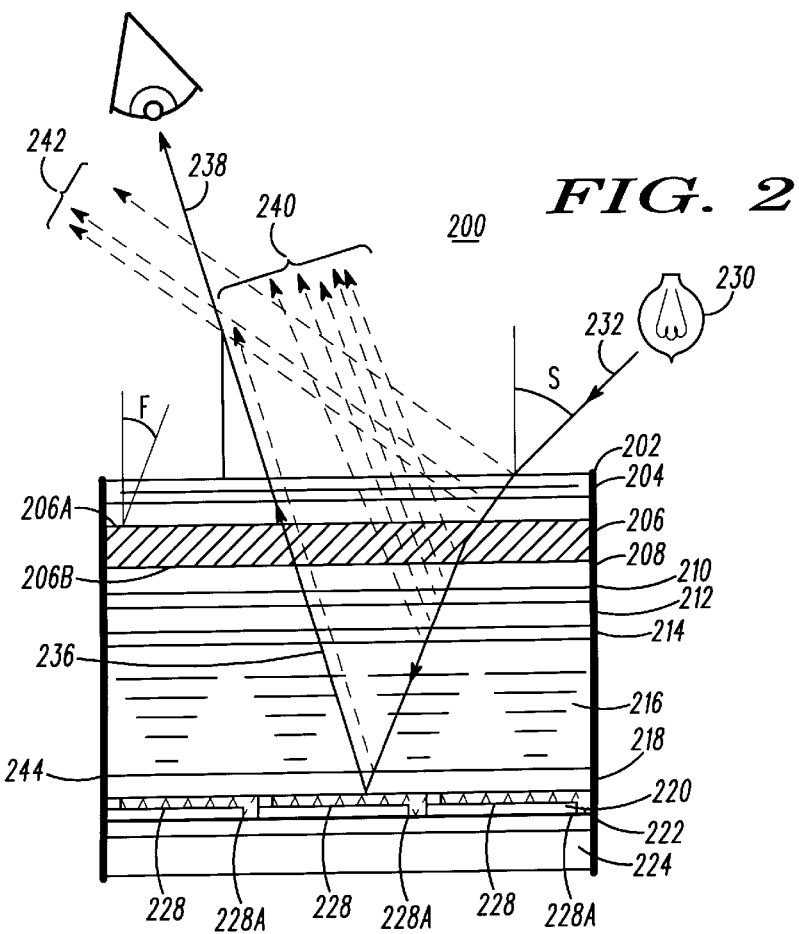
FIG. 2 is a sectional elevation view of a liquid crystal display including a slanted fringe volume hologram according to a preferred embodiment of the invention.

FIG. 2 is a sectional elevation view of a liquid crystal display 200 including a slanted fringe volume hologram 206 according to a preferred embodiment of the invention. The liquid crystal display 200 comprises a sequence of layers that will be described starting from the top of FIG. 2. The top most layer is a polarizer 202. A compensation layer 204 is located below the polarizer 202. The compensation layer 204 introduces a fixed polarization rotation. A slanted fringe volume hologram 206 is located below the compensation layer 204. The function of the slanted fringe volume hologram 206 is described below in more detail.

An upper liquid crystal containment wall 208 is located below the slanted fringe volume hologram 206. The slanted fringe volume hologram 206 includes a top side 206A and a bottom side 206B. A color filter array 210 is located below the upper liquid crystal containment wall 208. The color filter array 210 comprises an array of color filters.

A transparent counter electrode coating 212 is located below the color filter array and black mask layer 210. An upper liquid crystal alignment layer 214 is located below the transparent counter electrode coating 212. A liquid crystal material layer 216 is located below and in contact with the upper liquid crystal alignment layer 214. A lower liquid crystal alignment layer 218 (having an alignment axis that differs from that of the upper liquid crystal alignment layer 214) is located below and in contact with the liquid crystal material layer 216.

A plurality of reflective pixel electrodes 228 are located below the lower liquid crystal alignment layer 218. The reflective pixel electrodes 228 are preferably specularly reflective. According to a first alternative embodiment of the invention, the reflective pixel electrodes are diffusely reflective. An insulator layer 220 is located below the reflective pixel electrodes 228. A thin film transistor (TFT) and interconnect grid layer 222 is located below the insulator layer 220. A plurality of vias 228A extend from the reflective pixel electrodes 228 through the insulator layer 220 to the TFT and interconnect layer 222. A lower liquid crystal containment wall 224 is located below the TFT and interconnect layer 222. The upper 214 and lower 218 liquid crystal alignment layers serve to urge the liquid crystal material layer 216 to assume a twisted nematic state. The twisted nematic state persists in the absence of an applied electric field. In the absence of an applied electric field, the polarization of light is rotated by the liquid crystal material layer 216 by about ninety degrees as the light passes from the polarizer 202, to the reflective pixel electrodes 228 and back to the polarizer 202. After being rotated by 90 degrees light is unable to pass through the polarizer. Thus, in the absence of an applied electric field, pixels of the display 200 are in the off-state, meaning that they reflect very little light. In order to switch a particular pixel on a voltage is applied to one of the plurality of pixel electrodes 228 that is associated with that pixel in order to establish a localized electric field that disturbs the twisted nematic state of the liquid crystal material layer 216 in the pixel region. When the twisted nematic state of the liquid crystal material layer 216 is disturbed, the rotation of the polarization of light by the liquid crystal material layer 216 is reduced so that the amount of light that is able to pass the polarizer 202 is commensurately increased. Thus by modulating the polarization of light the intensity of reflect light is modulated. The liquid crystal material layer 216 serves as a polarization modulation element, however the ultimate purpose is to spatially intensity modulate light to form a displayed image.

Light passes into the display 200 from an ambient light source 230. The light is incident on the display 200 (i.e., on the polarizer 202) at an angle of incidence S (measured with respect to a perpendicular to the display surface). As discussed above 34 degrees is considered a typical angle of incidence S of source light on displays used in handheld devices. A first pencil of light from the source 230 that is incident on the display 200 is represented by ray 232. The first pencil of light is refracted somewhat at the surface of the upper polarizer 202 due to the index of refraction change, and again at the interface of the polarizer 202 and the compensation layer 204. An average fringe slant angle F that characterizes the slant of fringes of the slanted fringe volume hologram 206 is preferably chosen so that a substantial portion of light that is incident from the source 230 at angles within an expected range, preferably between 19 and 49 degrees, is deflected upon passing through the slanted fringe volume hologram 206. The first pencil of light is incident on the top side 206A of slanted fringe volume hologram 206. A second pencil of light that is formed by deflection of a substantial portion of light in the first pencil of light is represented by ray 234, and is characterized by a second angle. The fringe slant angle is chosen so that the second angle is non-zero (relative to normal to the display). A small portion of light from the first pencil of light may be diffracted into other diffraction orders outside of the second pencil of light. The second pencil of light emanates from the bottom side 206B of the slanted fringe volume hologram 206. Light in the second pencil of light is preferably more diffuse than light in the first pencil of light. The diffusion of light on passing through the slanted fringe volume hologram 206 is due to a degree of randomness in the pattern of fringes in the slanted fringe volume hologram 206. In the case of the first alternative embodiment of the invention mentioned above the slanted fringe volume hologram need not be diffusive. The degree of randomness is a consequence of the way in which the slanted fringe volume hologram 206 is manufactured. A preferred apparatus and method for manufacturing the slanted fringe volume hologram 206 is described below with reference to FIG. 3. In the pixel on state, the deflected light will pass through the layers (described above) of the display 200 to the reflective pixel electrodes 228. The deflected light will be reflected by the one of the reflective pixel electrodes 228 forming a third pencil of light represented by ray 236 that will impinge the bottom side 206B of the slanted fringe volume hologram 206. The angles characterizing the second and third pencils of light have the same magnitude but opposite signs. A substantial portion of the light in the third pencil of light will pass through the slanted fringe volume hologram 206 forming a fourth pencil of light represented by ray 238 that propagates from the top side 206A of the slanted fringe volume grating 206. In the preferred embodiment, the general direction characterizing the fourth pencil of light is substantially undeflected by the slanted fringe volume hologram 206 from the general direction characterizing the third pencil of light. Although not wishing to be bound by any particular theory of operation it is believed that the slanted fringe volume hologram 206 functions as a Bragg volume grating, and that the lack of deflection of the fourth pencil is due to the large angle between the third pencil of light and angles that satisfy Bragg's Law. The fourth pencil of light exits the display at an average view angle V that is different in both magnitude and direction (from normal) from the angle of source light incidence S. The fourth pencil of light includes light that has been modulated by the display 200. A small amount of light from the third pencil of light may be diffracted by the slanted fringe volume hologram 206 into other diffraction orders characterized by different angles of propagation. By diffusing light the slanted fringe volume hologram 206 serves to increase the angular extent of the viewing zone of the display 200.

A first quantity of scattered light indicated by rays 240 is scattered by the interfaces located between the slanted fringe volume hologram and the front surface 224A of the rear polarizer 224. The first quantity of scattered light exits the display 200 at the view angle V. The first quantity of scattered light is not modulated in intensity, and results in a small but undesirable decrease in the contrast of the display 200.

A second quantity of scattered light indicated by rays 242 is scattered from the surface of the upper polarizer 202 and from the interfaces located between the upper polarizer 202 and the top surface 206A of the slanted fringe volume hologram 206. The second quantity of scattered light exits the display 200 at an angle that is different from the view angle. By placing the slanted fringe volume hologram 206 below the polarizer 202 and the compensation layer 204, a liquid crystal display 200 is obtained in which light scattered at the surfaces of the polarizer 202 and the compensation layer 204 are scattered away from the angle of view V. Light scattered away from the field of view does not adversely effect the contrast of the display 200. An additional advantage that accrues from placing the hologram 206 below the polarizer 202 is that any light that is scattered in the viewing direction V by imperfections of the hologram 206 (e.g., localized imperfections or periodic imperfections) will be attenuated in passing through the polarizer 202.

According to a second alternative embodiment of the invention, the slanted fringe volume hologram 206 is shifted to a position below that shown in FIG. 2 closer to the liquid crystal material layer 216.

In order to accommodate the typical angles of incidence of source light, and in order to achieve a viewing zone that is centered within 15 degrees of perpendicular to the display 200, the average fringe slant angle F is preferably between about 6 and about 22 degrees from normal to the display 200. Preferably, aforementioned average fringe slant angle extends from normal to the display 200 away from a proximal side 244 of the display 200 which in use faces a user. Note that the view angle V extends in an opposite direction from normal to the display compared to the average fringe slant angle F. The average index of refraction of the slanted fringe volume hologram 206 is preferably between about 1.4 and 1.6.

Figure 3:
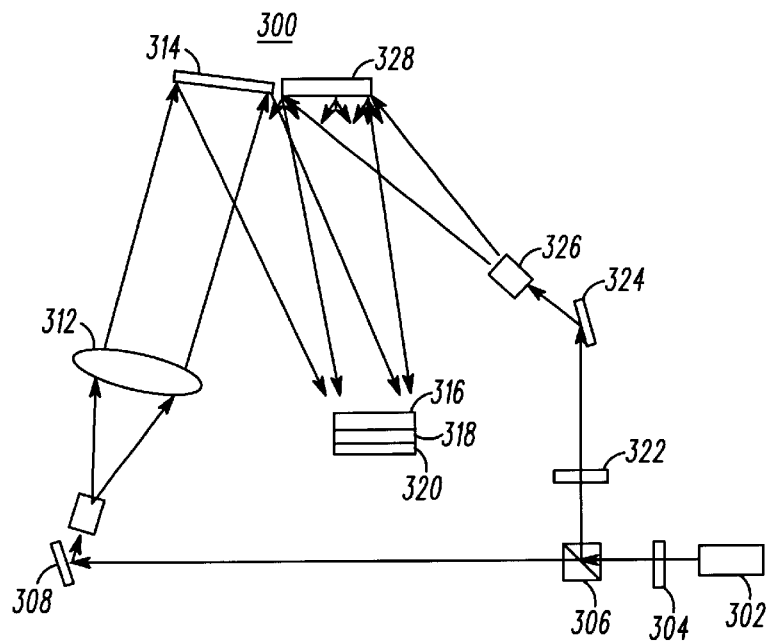
FIG. 3 is a schematic of an apparatus for producing the slanted fringe volume hologram according to the preferred embodiment of the invention.

FIG. 3 is a schematic of an apparatus 300 for producing the slanted fringe volume hologram 206 according to the preferred embodiment of the invention. The slanted fringe volume hologram 206, is preferably an off-axis hologram of a diffusive object. The apparatus comprises a laser 302 source. The laser 302 preferably outputs light in the green region of the visible spectrum. Output of the laser 302 is coupled through a first half-wave plate 304 to a polarizing beam splitter 306. The polarizing beam splitter 306 splits the received beam into first and second sub-beams. The first sub-beam is reflected by a first turning mirror 308 through a first lens-pinhole spatial filter 310. The first lens-pinhole spatial filter 310 filters undesirable modes from the first sub-beam. The first sub-beam diverges from the first lens-pinhole spatial filter 310 and is coupled through a collimating lens 312, to a second turning mirror 314. The second turning mirror 314 reflects the first sub-beam toward a glass superstrate 316, that overlies a holographic recording material blank 318. A black absorber 320 underlies the holographic recording material blank 318.

The holographic recording material blank 318 preferably comprises a photopolymer sheet that is suitable for making volume holograms. One type of photopolymer that is suitable for fabricating the slanted fringe volume hologram 206 is sold under the trade name "HRF-600" by Dupont Corporation of Wilmington, Del. The holographic recording material blank 318, and the slanted fringe volume hologram 206 produced from it are preferably less than about 30 microns thick. Too thick a slanted fringe volume hologram 206 would cause excessive scattering.

The second sub-beam produced by the polarizing beam splitter 306 is coupled through a second half wave plate 322, and in turn reflected by a third turning mirror 324 through a second lens-pinhole spatial filter 326. The second lens-pinhole spatial filter 326 filters undesirable components from the second sub-beam and diverges the second sub-beam. After passing through the second lens-pinhole spatial filter 326 the second sub-beam illuminates a diffusive object 328. The diffusive object preferably diffuses light from the second sub-beam over the entire range of solid angle subtended by the holographic recording material blank 318. As shown the diffusive object is reflective. Barium Sulphate, and Magnesium are two examples of materials that are know for their diffuse reflectance properties. According to a third alternative embodiment of the invention the second sub-beam is coupled through a transmissive diffuser such as a ground glass plate. The first sub-beam serves as a reference beam, and the second sub-beam serves as an object beam for forming the slanted fringe volume hologram 206.

The average of the angles that characterize the first sub-beam and the diffused second sub-beam as measured relative to the holographic recording material blank 318 is about the average fringe angle F. There is some variance in the angle of arrival of the light due to finite extent of the diffusive object 328, and the holographic recording material blank 318, and due to the diffusion of the second sub-beam. The first sub-beam is preferably is preferably incident on the material blank 318 at an angles between about 19 and 49 degrees, whereas the second sub-beam is preferably incident on the material blank 318 at an angle between about 0 and 19 degrees. The foregoing angles are chosen based on the typical source angle S and view angle V, in order to achieve high contrast spatial light modulation.

The first sub-beam serves as a reference beam and the second sub-beam serves as an object beam. The first sub-beam and the diffused second sub-beam interfere at the holographic recording material blank 318 thereby exposing the slanted fringe pattern. Exposure leads to localized changes in index of refraction of the blank 318. Material dependent post exposure development processing steps may be used to fix or enhance the exposed pattern before the slanted fringe volume hologram 206 is ready for use. Post exposure development processes are specified by the manufacturers of the recording material blanks. For example for the HRF-600 photopolymer mentioned above, heating at 120 C for two hours is effective to increase the degree of refractive index modulation produced during exposure.

Figure 4:
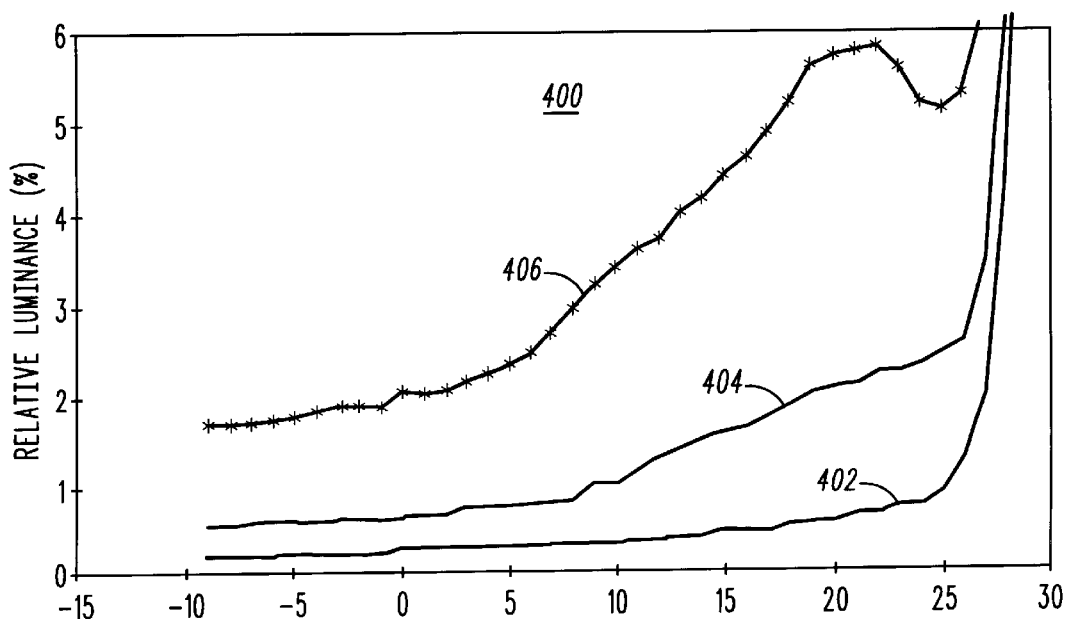
FIG. 4 is a graph of reflectivity measurements that demonstrate the effect on overall reflectance of switching the order of a polarizer and the slanted fringe volume hologram in a multilayer structure.

FIG. 4 is a graph 400 of reflectivity measurements that demonstrate the effect on overall reflectance of switching the order of a polarizer and the slanted fringe volume hologram 206 in a multilayer structure.

The ordinate of the graph 400 is luminance of reflected light on a relative scale. The abscissa or the graph is the angle of a detector used to measure reflectance with respect to the surface being measured (measured from perpendicular). The domain of the graph extends from −15 to 30 degrees. In the measurements each surface or multilayer structure being tested was illuminated by collimated light incident at −34 degrees. The lowest plot 402 shows the baseline reflectivity versus detector angle for a black acrylic that was used as an underlying absorber in two other tests. The middle plot 404 shows the reflectivity versus angle for a first multilayer stack consisting of a polarizer on top of the slanted fringe volume hologram 206 on top of the black acrylic. The upper plot 406 shows the reflectivity versus angle for a second multilayer stack in which the positions of the slanted fringe volume hologram 206 and the polarizer are reversed. Thus it is appreciated from the graph that by placing the slanted fringe volume hologram 206 below the upper polarizer 202, unwanted reflectance over a broad range of angles (including the viewing zone) is reduced in relative intensity. The reflectance measurements shown in FIG. 4 correspond to unmodulated reflectance of a liquid crystal display. Consequently, by locating the slanted fringe volume hologram 206 below the upper polarizer, a display that reflects less unmodulated light and offers increased contrast is obtained.

According to a fourth alternative embodiment of the invention a surface relief diffraction grating is used in lieu of the slanted fringe volume hologram 206. The profile of the surface relief grating may be filled with a material that has an index of refraction that differs from an index of refraction of the surface relief grating.

Figure 5:
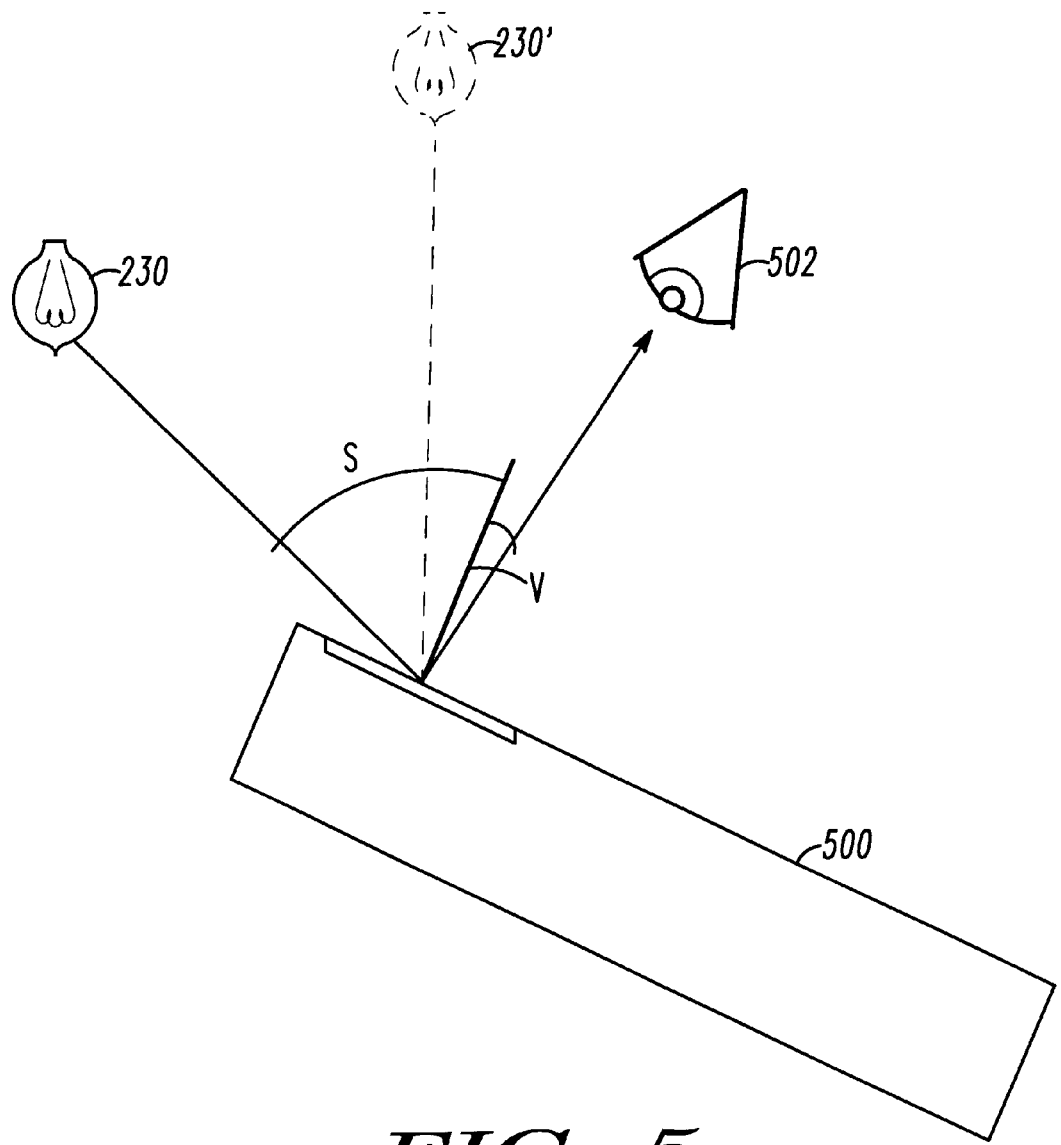
FIG. 5 is a schematic illustration of a handheld device that uses the liquid crystal display shown in FIG. 2.

FIG. 5 is a schematic illustration of a handheld device 500 that uses the liquid crystal display 200 of FIG. 2.

The handheld device 500 is positioned so that the line sight between a viewers eye 502 and the display 200 is at a view angle V that is preferably less than 15 degrees in magnitude. Light from the source 230 illuminates the display at an angle S which is typically between 19 and 49 degrees. An alternate position of the source indicated by reference numeral 230' is shown. The alternate position leads to a smaller source illumination angle within the aforementioned range. The slanted fringe volume hologram 206 establishes a directs a substantial portion of modulated light into a viewing zone that includes the angle of view V, and directs at least a substantial portion of unmodulated scattered light out of the viewing zone.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. A display comprising:
   a light modulating element;
      a polarizer located on a first side of the light modulating element;
      a reflective element located on a second side of the light modulating element; and
      an optical element that is:
         located between the light modulating element and the polarizer;
         includes a first side facing the polarizer, and a second side facing the light modulating element; and is adopted to:

receive a first pencil of light characterized by a first angle at the first side, and in response to receiving the first pencil of light, output a second pencil of light that is characterized by a second angle and includes a substantial portion of light from the first pencil of light at the second side;

receive a third pencil of light that is characterized by a third angle at the second side, and in response to receiving the third pencil of light output a fourth pencil of light that is characterized by a fourth angle and includes a substantial portion of light from the third pencil of light at the first side, wherein the first angle differs in magnitude from the fourth angle;

the optical element comprising a slanted fringe volume hologram that is characterized by a fringe slant angle.

2. The display according to claim 1 wherein:

the reflective element is specular and is adapted to form the third pencil of light by reflecting the second pencil of light.

3. The display according to claim 1 wherein the fringe slant angle is between about 6 and about 22 degrees from normal to the display.

4. The display according to claim 3 wherein the slanted fringe volume hologram is characterized by an average index of refraction of between about 1.4 and about 1.6.

5. The display according to claim 1 wherein the light modulating element comprises a light polarization modulating element.

6. The display according to claim 5 wherein the light polarization modulating element comprises a liquid crystal material.

7. A liquid crystal display comprising:

a layer of liquid crystal material;

a polarizer located on a first side of the layer of liquid crystal material; and a slanted fringe volume hologram located between the layer of liquid crystal material and the polarizer.

8. The liquid crystal display according to claim 7 wherein the slanted fringe volume hologram is an off-axis hologram of a diffusive object.

9. The liquid crystal display according to claim 7 wherein:

the slanted fringe volume hologram is manufactured by making a hologram of a diffuser in a photosensitive material.

10. The liquid crystal display according to claim 9 wherein:

the slanted fringe volume hologram is manufactured by impinging a reference beam on the photosensitive material at an angle between about 19 and about 49 degrees; and impinging an object beam on the photosensitive material at an angle between about zero and about 19 degrees.

11. The liquid crystal display according to claim 7 wherein:

the slanted fringe volume hologram is characterized by:

a average fringe slant angle of between about 6 and about 22 degrees; and an average index of refraction of between about 1.4 and about 1.6.

12. The liquid crystal display according to claim 11 wherein:

the slanted fringe volume hologram is manufactured by creating a hologram of a diffuser in a photosensitive material.

13. The liquid crystal according to claim 12 wherein:

the slanted fringe volume hologram is less than about 30 microns thick.

14. The liquid crystal display according to claim 13 wherein:

the photosensitive material is a photopolymer.

15. The liquid crystal display according to claim 13 further comprising:

a first alignment layer characterized by a first alignment axis in contact with a first side of the layer of liquid crystal material layer;

a second alignment layer characterized by a second alignment axis that is different from the first alignment axis in contact with a second side of the layer of liquid crystal material layer; and a plurality of reflective electrodes for applying electric fields to the layer of liquid crystal material in localized areas.

16. A handheld device comprising:

liquid crystal display including:

a layer of liquid crystal material;

a polarizer located on a first side of the layer of liquid crystal liquid crystal; and a slanted fringe volume hologram located between the layer of liquid crystal material and the polarizer.

17. The handheld device according to claim 16 wherein:

the slanted fringe volume hologram is characterized by:

a average fringe slant angle of between about 6 and about 22 degrees; and an average index of refraction of between about 1.4 and about 1.6.

18. The handheld device according to claim 17 wherein the slanted fringe volume hologram is an off-axis hologram of a diffusive object.

* * * * *